United States Patent [19]

Debier et al.

[11] Patent Number: 5,300,582

[45] Date of Patent: Apr. 5, 1994

[54] COUPLED ELASTOMERIC BLOCK COPOLYMERS

[75] Inventors: Eric R. S. Debier; Martine J. Dupont, both of Ottignies Louvain-la-Neuve, Belgium

[73] Assignee: Shell Oil Company, Houston, Tex.

[21] Appl. No.: 72,211

[22] Filed: Jun. 4, 1993

[30] Foreign Application Priority Data

Jun. 4, 1992 [EP] European Pat. Off. ........ 92201623.3

[51] Int. Cl.$^5$ ..................... C08F 297/04; C08L 53/02
[52] U.S. Cl. ..................... 525/314; 525/92; 525/95; 525/98
[58] Field of Search ..................... 525/314, 92, 95, 98

[56] References Cited

U.S. PATENT DOCUMENTS

| | | | |
|---|---|---|---|
| 4,092,375 | 5/1978 | Vreugdenhil | 525/314 |
| 4,163,764 | 8/1993 | Nash | 525/314 |
| 4,346,193 | 8/1982 | Warfel | 525/314 |
| 4,408,006 | 10/1983 | Milkovich et al. | 525/314 |
| 4,780,367 | 10/1988 | Lau et al. | 525/314 |
| 5,066,728 | 11/1991 | Audett | 525/314 |

FOREIGN PATENT DOCUMENTS

008146-A1 2/1980 European Pat. Off. .
368141-A2 5/1990 European Pat. Off. .
88/09800 12/1988 PCT Int'l Appl. .

OTHER PUBLICATIONS

PCT Search Report 93/01407.

*Primary Examiner*—James J. Seidleck
*Assistant Examiner*—Mark L. Warzel

[57] ABSTRACT

Novel block copolymers are disclosed of the formula $$(AB)_p (B)_q X$$

wherein A is polymerized monovinylaromatic compound, B is polybutadiene, X is the residue of a polyfunctional curing agent, p has a number average value of at least 1.5, q has a number average value of at least 0, and p+q are at least 4. Also disclosed are compositions useful as radiation curable adhesives which comprise the block copolymer and a tackifying resin.

7 Claims, No Drawings

COUPLED ELASTOMERIC BLOCK COPOLYMERS

FIELD OF THE INVENTION

This invention relates to certain block copolymers of defined structure containing at least one block derived from a vinylaromatic monomer and at least one block derived from a conjugated alkadiene.

BACKGROUND OF THE INVENTION

The broad field of elastomeric block copolymers is well known in the art as are pressure-sensitive adhesive formulations containing those block copolymers. Of particular interest are such adhesive compositions which provide high temperature resistance and good tack properties, even after the low radiation doses often used to cure the adhesive compositions. For a number of years efforts were directed to modifications of the block copolymer component which would provide increased processing speed but which would retain desirable adhesive properties.

In U.S. Pat. No. 4,152,231 there are disclosed cured polymer compositions possessing attractive cohesive strength at high temperature which are prepared by radiation curing of a polymer composition in an inert atmosphere. The polymer composition comprised a linear or radical conjugated diene polymer characterized by a number of homopolymer arms, or hydrogenated derivatives thereof. Also present as an essential component was a di- or tetrafunctional acrylate or methacrylate selected from acrylic acid or methacrylic acid esters of polyols, and a tackifying resin could be present as an optional component.

The preferred block copolymers of U.S. Pat. No. 4,152,231 were star polymers with up to 30 arms of substantially linear unsaturated polymer extending from a coupling agent nucleus which was preferably a poly(divinylbenzene) nucleus. The polymers were to have a molecular weight within specified ranges and rather specific amounts of radiation were to be employed for curing.

U.S. Pat. No. 4,163,764 describes other star-shaped block copolymers having arms initially produced from vinylaromatic hydrocarbon followed by formation of a second block of polymerized conjugated alkadiene. This reference does not disclose radiation curable compositions containing the block copolymers or enhancement of sensitivity to radiation curing of the polymers. U.S. Pat. Nos. 4,391,949 and 4,444,953 generally disclose block copolymers and the utility thereof in adhesive compositions. However, these references are not concerned with radiation curable adhesive compositions or enhancement of sensitivity to radiation curing of the block copolymer component.

It is known that block copolymers to be cured by radiation should contain polyisoprene midblocks in order to provide good processability. Most if not all commercially available styrene-based block copolymers contain polyisoprene midblocks if intended for radiation curable compositions.

A number of references are concerned with polystyrene-polyisoprene-polystyrene block copolymers curable by radiation. See, for example, Erickson, *Adhesive Age*, April 1986, pp. 22–24 and Ewins et al., *TAPPI Journal*, June 1988, pp. 155–158. These and other references indicate the conception that radiation curable block copolymer components of adhesive formulations should contain polymeric arms prepared from styrene and a branched conjugated alkadiene isoprene. Moreover, the composition should contain at least one additional multifunctional crosslinking agent and a tackifying resin. The choice of tackifying resin was said to be of particular importance with compositions designed to be cured by electron beam (EB) radiation.

In U.S. Pat. No. 5,066,728 there is disclosed a crosslinkable block copolymer having endblocks of polymerized phenylbutadiene and midblocks of polyisoprene or polybutadiene. Crosslinking under the influence of radiation takes place primarily in the endblocks.

Despite the knowledge of the art relative to adhesive compositions containing radiation curable block copolymers, it would yet be of advantage to provide block copolymers of relatively simple structure which demonstrate improved sensitivity for UV or EB radiation in hot melt compositions or solutions. More preferably, said polymers should also show good melt viscosity for use in hot melt, radiation curable adhesive compositions.

SUMMARY OF THE INVENTION

The present invention provides novel, radiation curable block copolymers as well as coating, sealing and adhesive compositions containing those polymers. The block copolymers are represent by the formula $$(AB)_p (B)_q X \tag{I}$$

Wherein
A is a poly(monovinylaromatic) block,
B is a poly(butadiene) block.
X is the residue of a polyvalent coupling agent,
p has a number average value of at least 1.5, and
q has a number average value of at least 0,
with the sum of p and q being an integer of at least 4. The polymer is further characterized by a vinylaromatic content of from about 7% wt to about 35% wt, a total apparent molecular weight of from about 50,000 to about 1,500,000 and a vinyl (1,2) content in each poly(butadiene) block of from about 35% to about 70%.

DETAILED DESCRIPTION OF THE INVENTION

In one aspect, the invention relates to novel block copolymers of the above Formula I. The poly(monovinylaromatic) block of such polymers is derived from styrene or homologs of styrene of up to 12 carbon atoms inclusive. Such monovinylaromatic compounds include styrene, p-methylstyrene, p-ethylstyrene, t-butylstyrene, m-propylstyrene, α-methylstyrene and α,4-dimethylstyrene. Although mixtures of such monovinylaromatic compounds are useful as precursor of a poly(monovinylaromatic) block, the preferred poly(monovinylaromatic) blocks are at least substantially homopolymeric with styrene or α-methylstyrene as the precursor. Particularly preferred as the monovinylaromatic compound is styrene.

It will be appreciated that the specified values of p and q have to be regarded as number average values, due to the occurrence of a mixture of a series of individual molecules as obtained according to hereinafter specified preparation methods. E.g., in case of a ratio between the initially prepared living polymers A—B—Li and B—Li of about 1.0 and a tetravalent coupling agent, the individual $(AB)_2(B)_2X$ molecules occur in an amount of 37.5%.

In the preferred poly(monovinylaromatic compound)/polybutadiene block copolymer of the above formula I, each A block has an apparent molecular weight of from about 5,000 to about 125,000, more preferably from about 7,000 to about 50,000 and most preferably from about 9,000 to about 12,000. Each B or polybutadiene block has an apparent molecular weight from about 15,000 to about 250,000, preferably from about 25,000 to about 80,000. In these preferred compounds, X is the residue of a tetrafunctional coupling agent, p and q independently have an average value of from about 1.5 to about 2.5, preferably from 2.1 to 1.9, and more preferably of about 2, and the sum of p and q is 4. The total apparent molecular weight of these preferred block copolymers is from about 50,000 to about 350,000 with particularly preferred block copolymers having an apparent molecular weight from about 200,000 to about 300,000.

The poly(monovinylaromatic compound)-/polybutadiene block copolymers are produced by methods which are well-known and conventional in the art. In an illustrative preparation, a preferred block copolymer as described is produced by the process which comprises polymerizing the monovinylaromatic compound in the presence of a monovalent lithium-containing initiator such as n-butyllithium to produce a "living" poly(monovinylaromatic compound) of the general formula

A—Li    (II)

where A is a block of polymerized monovinylaromatic compound, and subsequently polymerizing butadiene in the presence of the compound of formula II to produce a block copolymeric compound of the general formula

A—B—Li    (III)

wherein A has the above meaning and B is a block of polymerized butadiene. It should be appreciated that small amounts of other conjugated alkadiene could be present, but the B block is at least predominately polybutadiene. The polybutadiene block is produced under conditions which will produce predominately the 1,2-polymerized product, i.e., 1,2-polybutadiene, by methods well-known and understood in the art. Preferred polybutadiene blocks have a 1,2 content often termed "vinyl" content because of the pendant vinyl groups of the polybutadiene polymer chain, of from about 35% to about 70%, more preferably from about 45% to about 70%.

As a second precursor of the block copolymers of the invention, butadiene is separately polymerized in the presence of a monovalent initiator such as butyllithium to produce a polymer block of the formula B—Li    (IV)

wherein B is a polymerized butadiene block, predominately as 1,2-polybutadiene.

The block copolymers of the invention are produced by coupling the A—B—Li and B—Li in appropriate proportions with a tetravalent coupling agent.

The coupling agent whose residue is represented by the term "X" is preferably a tetravalent coupling agent, including conventional tetravalent coupling agents such as silicon tetrachloride or silicon tetrabromide. The coupling of the living block polymeric materials of formulas III and IV is by methods conventional and well understood in the art. The coupling process efficiently produces the block copolymers of the above formula I.

A related class of block copolymers, also useful in the compositions of the invention, is of the formula

$(AB)_r(B)_sX'$    (V)

wherein A and B have the above-stated meanings, r is a number from about 3 to about 20, preferably from about 3 to about 10, and s has a value of from 0 to about 10. The term "X" is the residue of a polyfunctional curing agent having a functionality greater than 4, for example, a functionality of at least 6. Preferred coupling agents of this class have a functionality of from at least 6 to about 20. In the block copolymers of the formulas V, the ratio of r to r+s is at least 0.5.

The block copolymers are of relatively simple structure and are prepared with which coupling efficiency, frequently of at least 95%. The polymers exhibit an improved EB or UV radiation sensitivity to cured products of improved high temperature resistance without the need for supplemental cross-linking agents such as acrylates.

An additional aspect of the present invention is polymer compositions based on the block copolymer of the invention which are solution or hot melt compositions and show improved sensitivity to EB and/or UV radiation curing. Such compositions comprise the block copolymers of the invention with other components normally found in solution or hot melt pressure sensitive adhesive compositions.

The radiation curable adhesive formulations of the invention comprise a minor amount of the block copolymers of the invention and a major amount of a tackifying resin. The compositions optionally contain minor amounts of conventional components. The tackifying resin component of the compositions is a resin having a relatively low level of carbon-carbon unsaturation. Illustrative of such resins useful in the compositions of the invention are saturated resins, esters of resins, polyterpenes, terpene phenol resins, polymerized mixed olefins and mixtures thereof. The proportion of tackifying resin is from abut 0 parts mixtures thereof. The proportion of tackifying resin is from about 0 parts by weight of tackifying resin per 100 parts by weight of block copolymer. Preferred quantities of tackifying resin are from about 50 parts to about 200 parts by weight of tackifying resin per 100 parts by weight of block copolymer.

The tackifying resins are known and many are commercial, being marketed under the tradenames ESCOREZ®, REGALITE®, REGALREZ® and ZONATAC®.

Although not required as components of the radiation curable block copolymer composition of the invention, a number of other components are useful for better results in some applications. One such optional component is a modifying resin that is compatible with the poly(monovinylaromatic compound) block. Such resins are conventional and are selected by employing the test for compatibility disclosed in U.S. Pat. No. 3,917,607. The resin will preferably have a softening point above 100° C. as determined by ASTM method E28.

Also useful as a component of the compositions is a plasticizer such as rubber extending or compounding oil which is a oil having a relatively high content of saturated non-aromatic carbon-carbon linkages or alternatively is an oil of high aromatic content. A group of said alternative plasticizers are olefin oligomers or low molecular weight polymers, animal or vegetable oil or derivatives thereof, or petroleum-based oils of relatively high boiling point with only a minor proportion, i.e., less than 15% by weight based on total oil of aromatic hydrocarbons.

Useful olefin oligomers or polymers include polypropylene, polybutylene, hydrogenated polyisoprene and hydrogenated polybutylene having a molecular weight from about 200 to about 10,000. Vegetable or animal oils are illustrated by glycerol esters of fatty acids. The petroleum-based oils are conventional and a number are commercial being marketed under the trademarks SHELLFLEX®, ONDINA®, PRIMOL® and WITCO®.

The use of a plasticizer is optional but use of a quantity of plasticizer up to about 500 parts by weight per 100 parts of block copolymer is satisfactory. When plasticizer is present, a preferred amount is from about 5 parts to about 60 parts by weight per 100 parts of block copolymer.

It is also useful on occasion to provide a petroleum based wax to impart fluidity to the molten composition and flexibility to the cured composition. Such waxes include both paraffin and microcrystalline waxes having a melting point from about 54° C. to about 107° C., as well as synthetic waxes such as low molecular weight polyethylene and Fischer-Tropsch waxes. Useful amounts of such waxes are up to about 100 parts by weight per 100 parts of block copolymer with preferred quantities being from 0 to about 15 parts by weight per 100 parts of block copolymer.

The compositions also suitably contain one or more of conventional additives such as stabilizer, antioxidants, pigments and fillers which do not adversely effect to adhesive properties of the compositions. It is customary, although not essential, to provide a stabilizer or an antioxidant to protect the composition against degradation during the preparation and/or use of the composition, provided that the stabilizer or antioxidant does not interfere with the curing of the adhesive composition. Such stabilizers and antioxidants are conventional and include hindered phenols, aromatic amines, sulfur compounds and aromatic phosphites. Commercial illustrations of the stabilizers and antioxidants are marketed under the trademarks IRGANOX®, IONOX®, and POLYGARD®. When present, a quantity of stabilizer or antioxidant from about 0.01% to about 5% by weight based on total composition is satisfactory.

The adhesive compositions of the invention are prepared by conventional methods. As an example, the block copolymer, the tackifying resin and any other desired component are blended at an elevated temperature, e.g., temperature of about 160° C., using an extruder, a Z-blade mixer or other conventional mixing device. A preferred method employs an extruder to mix the composition and feed the die used to coating as disclosed in U.S. Pat. No. 3,984,509. The compositions are particularly suited for preparation as 100% solids hot-melt adhesives because of relatively low processing viscosities and adequate pot life at processing temperatures from about 150° C. to about 180° C.

The compositions of the invention are radiation curable compositions being cured by exposure to radiation such as electron beam radiation or ultraviolet radiation. When curing is effected through electron beam radiation, the energy required for cross-linking is obtained from any conventional source such as an electron gun, an atomic pile, a Van de Graff electron accelerator, a betatron or a cyclotron. The cross-linking is conducted conveniently at ambient temperature, preferably in an inert atmosphere, by conventional procedures. The particular amount of radiation to be employed will depend upon the particular composition and proportion of components of the composition to be cured. Suitable doses of electron beam irradiation are from about 0.5 Mrad to about 7 Mrad. Preferred doses are from about 1 Mrad to about 6 Mrad.

The adhesive composition is also cross-linked or cured by exposure to ultraviolet light. In this modification, it is often useful to include within the composition to be cured a small proportion of a conventional photo-initiator or ultraviolet sensitizing compound. Illustrative of the photo-initiator compounds are benzophenone, propiophenone, betanaphthaldehyde, pyrene and anthracene as well as the substituted arylketones disclosed in U.S. 4,852,862. A photo-initiator to be used is employed in a quantity from about 0.5 part to about 5 parts by weight per 100 parts of block copolymer, preferably from about 1 part to about 4 parts by weight per 100 parts of block copolymer.

The compositions are particularly useful as radiation curable adhesives in the preparation of pressure-sensitive tapes or in the manufacture of labels.

The invention is further illustrated by the following Illustrative Embodiments and the comparisons with KRATON® D-1320X radial polymers which are not of the invention. The Illustrative Embodiments should not be regarded as limiting.

ILLUSTRATIVE EMBODIMENT 1

A series (I-XII) of branched block copolymers was prepared by the procedure which follows. To a first reactor of 5 liter capacity was added 3 liters of cyclohexane which had been stripped with nitrogen for about 30 minutes. After the addition of 150 g of styrene, the reactor contents were titrated at room temperature with 12% by weight sec-butyllithium (BuLi) in cyclohexane to scavenge any impurities present. BuLi, 15.6 mmol, was then added and the temperature of the mixture was then raised to and maintained at 50° C. After about 30 minutes, the resulting mixture containing poly(styrene)-lithium was transferred to a second reactor of 10 liter capacity containing about 3 liters of stripped cyclohexane and various amounts of diethoxyethane modifier and 350 g of butadiene, which had previously been titrated with BuLi.

The temperature of this reaction mixture was then raised to 50° C., a predetermined amount of BuLi was added and 500 g of butadiene was gradually added over a 30 minute period. The temperature of the resulting mixture was raised to and maintained at 80° C. as 7.7 mmols of silicon tetrachloride were added. The coupling reaction which followed was performed in about 30 minutes.

After about 2 hours 10 g of 2,6-di-t-butyl-4-methylphenol was added and the solvent was removed by steam stripping. The polymer thereby obtained was dried in an oven at 60° C. for 5-6 hours.

The properties of the branched block copolymers I–VI are listed in Table 1 together with the quantities of the precursors thereof.

By a procedure substantially similar to that above, polymers VII–XII were produced. The properties of these polymers and the quantities of their precursors are described in Table 2.

TABLE 1

| | reactor 1 | | | reactor 2 | | | | | | vinyl content (%) | percent SB arms (%) |
|---|---|---|---|---|---|---|---|---|---|---|---|
| Example | cyclohexane (kg) | styrene (g) | BuLi (mmol) | cyclohexane (kg) | butadiene batch (g) | diethoxy ethane (ppm) | BuLi (mmol) | butadiene dose (g) | SiCl₄ (mmol) | | |
| I* | 2.41 | 152 | 15.6 | 2.41 | 350 | 0 | 15.6 | 500 | 7.7 | 8 | 50 |
| II* | 2.34 | 150 | 14.9 | 2.34 | 350 | 60 | 13.9 | 500 | 7.1 | 31 | 50 |
| III | 2.34 | 150 | 14.3 | 2.34 | 350 | 75 | 13.3 | 500 | 7.1 | 42 | 50 |
| IV | 2.34 | 150 | 14.1 | 2.34 | 350 | 150 | 13.1 | 500 | 7.8 | 59 | 50 |
| V | 2.34 | 150 | 13.6 | 2.34 | 350 | 225 | 13.0 | 500 | 7.8 | 68 | 50 |
| VI | 2.34 | 130 | 12.5 | 2.34 | 350 | 150 | 22.8 | 820 | 7.8 | 62 | 35 |

*Polymers outside invention

TABLE 2

| | reactor 1 | | | reactor 2 | | | | | | vinyl content (%) | percent SB arms (%) | coupling efficiency (%) |
|---|---|---|---|---|---|---|---|---|---|---|---|---|
| Example | cyclohexane (kg) | styrene (g) | BuLi (mmol) | cyclohexane (kg) | butadiene batch (g) | diethoxy ethane (ppm) | BuLi (mmol) | butadiene dose (g) | coupling agent (mmol) | | | |
| VII | 2.35 | 100 | 9.1 | 2.35 | 350 | 250 | 4.5 | 550 | SiCl₄ (4.4) | 62 | 70 | 90 |
| VIII | 2.35 | 100 | 9.3 | 2.35 | 350 | 250 | 11.8 | 550 | SiCl₄ (6.1) | 60 | 50 | 93 |
| IX | 2.35 | 100 | 11.1 | 2.35 | 350 | 250 | — | 550 | SiCl₄ (3.5) | 63 | 100 | 85 |
| X | 2.34 | 100 | 9.5 | 2.34 | 350 | 250 | — | 550 | DVB (38.1) | 63 | 100 | 87 |
| XI | 2.34 | 100 | 10.3 | 2.34 | 350 | 250 | 12.9 | 550 | DVB (41.2) | 62 | 50 | 96 |
| XII | 2.34 | 100 | 9.6 | 2.35 | 350 | 250 | 4.8 | 550 | DVB (38.4) | 63 | 70 | 91 |

ILLUSTRATIVE EMBODIMENT 2

An adhesive formulation was prepared from each of the block polymers I–VI which comprised 100 parts by weight of the block copolymer, 90 phr of FORAL 85, a tackifying resin, and 1 phr of IRGANOX 1010. The hot melt viscosity of the formulations were determined and compared in Table 3. The polymers were generally stable under processing conditions with the stability improving with increased vinyl content.

TABLE 3

| Polymer | Hot-melt viscosity at 180° C. (Pa.s) | Hot-melt viscosity after 3 hours at 180° C. (Pa.s) |
|---|---|---|
| I | 115 | 120 |
| II | 53 | 75 |
| III | 75 | 105 |
| IV | 52 | 70 |
| V | 40 | 40 |
| VI | 117 | 320 |
| Kraton D-1320X | 200 | 380 |

ILLUSTRATIVE EMBODIMENT 3

An adhesive formulation was prepared from each of the polymers VII–XII which comprised 100 parts by weight of the block copolymer, 90 phr of FORAL 85, 15 phr of SHELLFLEX 451 and 2 phr of IRGANOX 1010. The viscosity of each formulation was determined with a Brookfield Thermosel.

TABLE 4

| | Melt viscosity (Pa.s) | |
|---|---|---|
| Polymer Code | after 30 min. | after 180 min. |
| XI | 338 | >2000 |
| XII | 1900 | >2000 |
| X | >2000 | >2000 |

TABLE 4-continued

| | Melt viscosity (Pa.s) | |
|---|---|---|
| Polymer Code | after 30 min. | after 180 min. |
| VIII | 127 | 299 |
| VII | 828 | >2000 |
| IX | 1690 | >2000 |
| D1320X | 112 | 125 |

ILLUSTRATIVE EMBODIMENT 4

A radiation sensitive adhesive formulation based on KRATON® D-1320X Thermoplastic Elastomer was prepared a mixture of 100 parts block copolymer, 150 phr REGALITE® R91, 60 phr REGALREZ® 1018, 3 phr IRGACURE® 651 and 1 phr IRGANOX® 1010.

Polymers I–VI were compounded into similar formulations with quantities of components adjusted to give the same mid-block Tg. In each case, however, the fraction of polybutadiene mid-block was held constant to avoid the mid-blocks having different sensitivities to radiation. The test was conducted with varying loads per square inch after UV curing at 5 m/min under a Fusion D-bulb. The samples had been coated at 22 g/m². In Table 5, the load was 0.5 kg per square in. and in Table 6 the load was 1 kg per sq. in.

TABLE 5

| | 1 Pass (h) | 2 Pass (h) |
|---|---|---|
| I | 0 | 4.2 |
| II | 0.5 | 0.3 |
| III | 3.3 | >280 |
| IV | >116 | >280 |
| V | >116 | >280 |
| VI | >116 | >280 |
| KRATON D-1320 X | 60 | >280 |

TABLE 6

| | 1 Pass (h) | 2 Pass (h) |
|---|---|---|
| IV | 0.3 | >280 |
| V | 106 | >280 |
| VI | >280 | >280 |

TABLE 6-continued

| | 1 Pass (h) | 2 Pass (h) |
|---|---|---|
| KRATON D-1320 X | 0.2 | 8.6 |

Polymers I to VI were also compared to KRATON ® D-1320X by Shear Adhesion Failure Temperature (SAFT) after UV curing. The results are given as a function of the dosage in Table 7.

TABLE 7

| | 0 Pass, °C. | 1 Pass, °C. | 2 Pass, °C. |
|---|---|---|---|
| I | 80 | 103 | 165 |
| II | 79 | 112 | 180 |
| III | 77 | 128 | 115 |
| IV | 99 | >188 | >185 |
| V | 75 | >179 | 185 |
| VI | 78 | 154 | >185 |
| KRATON D-1320 X | 77 | 148 | 157 |

ILLUSTRATIVE EMBODIMENT 5

For certain of the block copolymers, an adhesive formulation was prepared which combined 100 parts of block copolymer, 90 phr FORAL 85, 15 phr SHELLFLEX 451, 3 phr of IRGACURE and 2 phr of IRGANOX 1010. The formulations were subjected to UV curing and EB curing and the cured materials were tested for SAFT. The results after UV curing are shown in Table 8 and the results after EB curing are shown in Table 9.

TABLE 8

| | | SAFT, °C. | | | | |
|---|---|---|---|---|---|---|
| | S-B content | UV-dose, number of passes at 15 m/min | | | | |
| Polymer | (%) | 0 | 1 | 2 | 3 | 4 |
| XI | 50 | 80 | >200 | >200 | >200 | >200 |
| XII | 70 | 101 | >200 | >200 | >200 | >200 |
| X | 100 | 115 | >200 | >200 | >200 | >200 |
| VIII | 50 | 79 | 93 | >200 | >200 | >200 |
| VII | 70 | 100 | 151 | >200 | >200 | >200 |
| IX | 100 | 103 | 158 | >200 | >200 | >200 |

TABLE 9

| | | EB-dose, Megarads | | |
|---|---|---|---|---|
| Polymer | S-B content (%) | 0 | 1 | 2 |
| XI | 50 | 80 | 109 | >200 |
| XII | 70 | 101 | >200 | >200 |

TABLE 9-continued

| | | EB-dose, Megarads | | |
|---|---|---|---|---|
| Polymer | S-B content (%) | 0 | 1 | 2 |
| X | 100 | 115 | 146 | >200 |
| VIII | 50 | 79 | 83 | 85 |
| VII | 70 | 100 | 113 | 126 |
| IX | 100 | 103 | 120 | 137 |

Certain of the polymers, e.g., polymers VI, X, XI and XII, have sufficiently high melt viscosities to render hot melt adhesive applications difficult. Such polymers are useful in solution pressure-sensitive adhesive compositions because of their excellent radiation sensitivity. The preferred polymers, whose compositions demonstrate low melt viscosity and radiation sensitivity, are illustrated by polymers IV and V.

What is claimed is:

1. A block copolymer of the formula

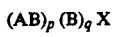

wherein A is a block of polymerized styrene, B is a block of polybutadiene, X is the residue of a tetrafunctional coupling agent, each of p and q have a number average value from about 1.5 to about 2.5 inclusive and the sum of p and q is 4, the polymer having a styrene content from about 7% by weight to about 35% by weight based on total polymer, a total apparent molecular weight of from about 50,000 to about 1,500,000 and a vinyl content in the polybutadiene blocks of from about 35% to about 70%.

2. The polymer of claim 1 wherein the styrene content is from about 10% by weight to about 20% by weight based on total polymer.

3. The polymer of claim 1 wherein the vinyl content of the polybutadiene is from about 45% to about 70%.

4. The polymer of claim 1, wherein each of p and q have an average value from 2.1 to 1.9.

5. The polymer of claim 1 wherein the total apparent molecular weight of the polymer is from about 200,000 to about 300,000.

6. A polymer composition comprising the polymer of claim 1 and from 0 parts to about 500 parts by weight per 100 parts of polymer of a tackifying resin having a relatively low level of carbon-carbon unsaturation and compatible with the polybutadiene blocks.

7. The composition of claim 5 wherein the tackifying resin is a saturated resin, an ester of a resin, a polyterpene, a terpene phenol resin, a polymerized mixed olefin or a mixture thereof.

* * * * *